United States Patent Office 3,135,554
Patented June 2, 1964

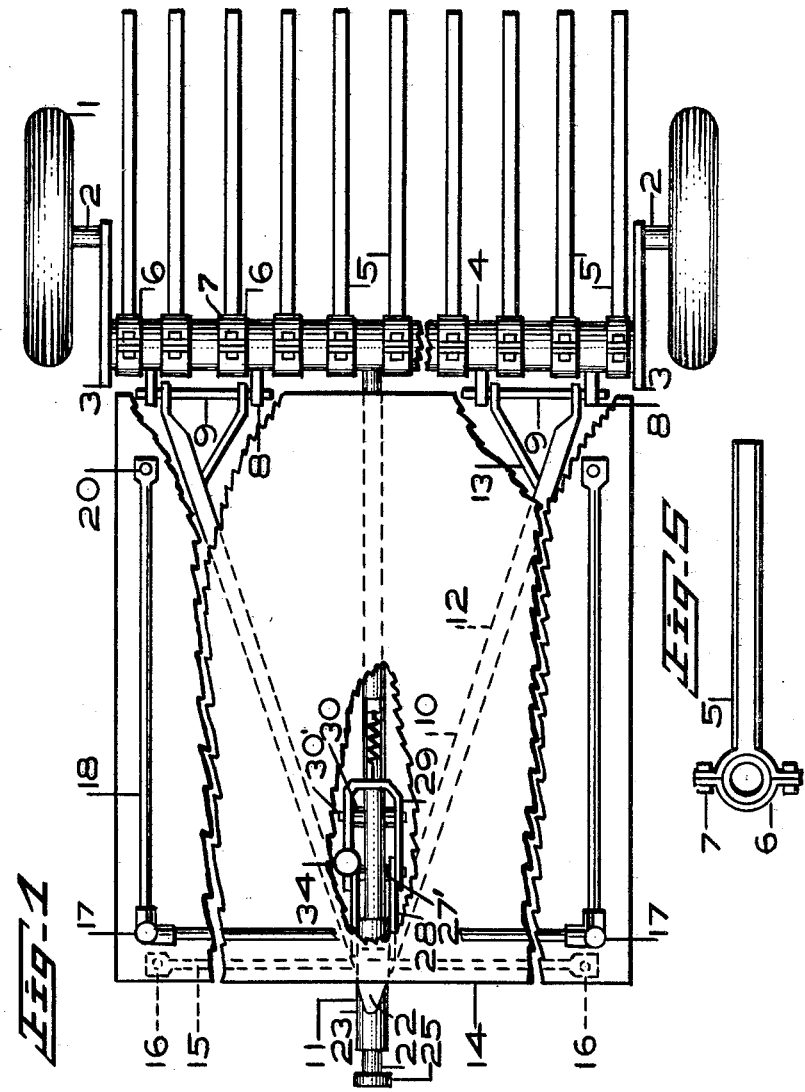

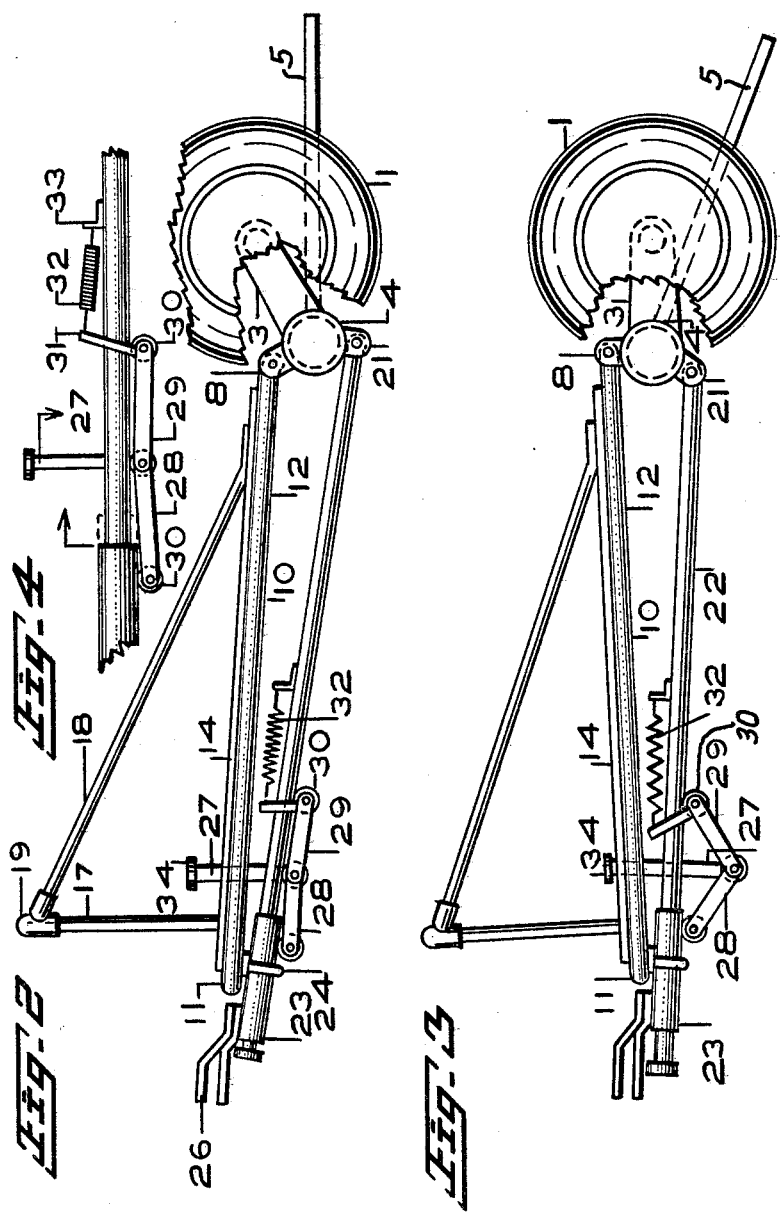

3,135,554
BALE STOOKER
George Williamson, Red Deer, Alberta, Canada
Filed Mar. 14, 1963, Ser. No. 265,921
5 Claims. (Cl. 298—5)

This invention relates to bale stookers, having particular reference to a stooker for attachment in following relation to a baler, to receive the bales from the baler and discharge the bales in a shaped pile on the ground.

In the art to which the invention relates, the bales discharging from the baler fall on the ground where they lie with a flat side down and an upper side exposed to the weather, and if not gathered immediately the bales may become damaged. Bale stookers for attachment in following relation to a baler have been proposed, but in most cases these are complicated and expensive to manufacture.

The present device is concerned with providing an improved bale stooker for attachment in following relation to a baler, the stooker having a platform on which a bale handler for the stooker stands, and a bale piling fork attached to the rear of the platform and normally held horizontally disposed in position to receive bales, and secured by locking means that are releasable by the bale handler to allow the fork to gravitate rearwardly downward for sliding the bale pile off the fork on to the ground.

Novel features and advantages of this bale stooker include mounting the rear end of the axle shaft supporting the platform eccentrically supported by ground wheels, and having the fork for carrying the bale pile attached to the axle shaft, and including means associated with the axle shaft and platform for locking the platform in a horizontal position and releasable for tilting the bale carrying fork rearwardly downward for discharge of the bale pile, this at the same time tilting the platform rearwardly upward, and on discharge of the bale pile the platform, counterbalancing the fork, tilts the fork upward into a horizontal bale receiving position, where it is secured automatically by locking means.

Other features and advantages of the invention will become apparent by reference to the accompanying description taken in conjunction with the drawings.

In the drawings, wherein is illustrated a preferred embodiment of the invention, FIG. 1 is a top plan view of the bale stooker, shown with the bale carrying fork teeth horizontally disposed in bale receiving position, and with parts broken away, and with the hitch for the stooker omitted.

FIG. 2 is a side view of the bale stooker, shown with the platform horizontal as it would be when loading a bale pile on the fork and with a wheel broken away to disclose the axle shaft.

FIG. 3 is a side view, similar to the showing in FIGURE 2, but with the platform rearwardly tilted upward, as it would be when the fork is tilted downward in discharging a pile of bales on to the ground.

FIG. 4 is an enlarged side view showing the locking mechanism and trip for the platform, including a fragment of the locking bar and a fragment of the sleeve in which the locking bar is slidable.

FIG. 5 is a side view showing a tooth coupling with a fragment of a tooth attached thereto.

Having reference to the drawings, ground wheels 1 are mounted for rotation on stub axles 2 fixed to arms 3 that have fixed thereto an axle shaft 4 extending transversely between the arms parallel with the axis of the wheel axles.

To this axle shaft is attached a series of teeth 5 forming in conjunction with the axle shaft the fork for building the bale pile on. These teeth may be welded to the axle shaft, but are preferably attached by couplings formed by mating halves 6 connected by bolts 7, the one half of each coupling having a tooth integrally fixed thereto.

The axle shaft 4 includes upstanding arms or lugs 8 fixed thereto, with connecting rods 9 mounted in the lugs and to which pivotally attach the ends of a frame bar 10. The frame bar is formed in one piece and includes a connecting forward bend 11, the side portions 12 of the frame bar diverging rearward, and these side portions are reinforced by braces 13. On the frame bar is a platform 14, which is forwardly reinforced by a rod 15 attached at the ends to the under side of the platform, as by lugs 16 (FIG. 1) secured by bolts or like means. The platform may also include posts 17 forwardly mounted on the platform sides and having side rails 18 attached thereto by pipe couplings 19 and to the platform by bolts at 20.

Centrally located on the under side of the axle shaft 4 is a lug 21 to which pivotally attaches a locking bar 22 that extends forwardly and is mounted endwise slidable in a sleeve 23 that is fixed to a clamp 24 that is attached to the under side of the frame bar connecting bend 11, as by welding. The locking bar 22 includes an end cap 25 limiting backward movement of the locking bar.

A hitch 26 is attached, as by welding, to the upper side of the sleeve 23.

The trip for release of the locking bar includes a trip bar 27 vertically slidable in a suitable opening in the platform 14, and this trip attaches to one of a pair of links 29 that pivots on a pin and sleeve coupling 27' to links 28, the links 28 pivotally attaching to the under side of the sleeve 23 by pin and link couplings, similar to the couplings 27', and the links 29 pivotally attaching to a pin 30' with sleeve 30 that is attached to the under side of the bar 22. A spring, as at 32, is connected to the links 29 and anchored to the bar 22 for normally holding the links with the trip bar 27 raised, as in FIGURES 2 and 4, the locking bar end cap 25 limiting this rearward movement of the locking bar. This is brought about by the spring connection 32 pulling upward on the link 29 until the pivotal connections of the links with the trip bar is above the pivotal connections of the links with the sleeve and locking bar, so that further pressure on the locking bar pushes upward on the trip bar, as shown in FIGURE 4. A foot pedal 34 on the trip bar 27 limits downward movement of the trip bar by the pedal coming into contact with the platform 14.

In the use of the device, bales are piled on the fork teeth 5 by the bale handler, who takes the bales as they discharge from the baler on to the platform 14, the lower longitudinal edge of each bale being set in the space between teeth until a lower row of bales is completed, and on this row is piled additional rows until an inverted V-shaped pile of bales is formed. This pile could consist of 6, 10, 15, etc. bales according to the width of the fork.

In forming the bale pile on the fork the trip bar is up, with the links 28 and 29 raised as in FIGURE 2. To discharge the bale pile, the bale handler presses with a foot down on the trip pedal 34, which, through the links 28 and 29 moving downward below the pivotal connections of the links with the sleeve and locking bar, serves to disengage the locking bar and the weight of bales on the fork teeth tilts the fork downward, the locking bar and links moving to the positions shown in FIGURE 3 and the bales sliding off the fork in a pile on the ground. When the bale pile has been discharged the weight of the platform turns the axle shaft 4 and raises the teeth 5 to a horizontal bale receiving position. In the latter part of this movement the pivotal connection of the links 28 and 29 to the trip bar 27 moves upward above the pivotal connections of the links with the sleeve and locking bar, and this locks the fork against downward movement.

I claim:

1. In a bale stooker for attachment in following relation to a traveling baler, said stooker including a ground wheel assembly comprising a pair of wheels rotatable on stub axles and parallel arms fixed to the axles extending at right angles thereto, an axle shaft mounted on the arms axially aligned parallel with said axles, a frame having a platform thereon, means mounting the frame pivoted rearwardly to the axle shaft, a hitch for the forward end of the frame, teeth on the axle shaft extending rearwardly and forming therewith a fork on which a pile of bales may be erected, a locking bar having its rear end pivotally attached to the axle shaft for turning said shaft by endwise movement of the locking bar, a sleeve forwardly fixed to the frame and in which the locking bar is endwise slidable, spring held locking means engaging the locking bar and sleeve normally holding said bar with the fork in bale receiving position and a trip bar mounted vertically slidable in the platform engaging the locking means for effecting release thereof.

2. A bale stooker as set out in claim 1 in which the fork formed by the axle shaft and teeth is counterbalanced by the frame and platform with the teeth normally held thereby in position to have bales piled thereon, and the means holding the locking bar with the fork held in bale receiving position, including links pivotally attached to the trip bar and to the locking bar and sleeve and with the trip bar connection to the links normally held above a horizontal alignment of the links.

3. In a bale stooker for attachment in following relation to a traveling baler, said stooker including a frame having a hitch for attachment of the stooker to the baler and a platform on the frame, and said stooker further having a ground wheel assembly including a pair of wheels with stub axles on which the wheels are rotatable and arms fixed to the stub axles and an axle shaft fixed to the arms axially aligned parallel with the stub axles, upstanding lugs on the axle shaft, means pivotally attaching the rear end of the frame to said lugs, teeth fixed to the axle shaft rearwardly projecting, said frame and platform counterbalancing said teeth and normally holding the axle shaft with the teeth in position to receive a pile of bales thereon, a downwardly extending lug on the axle shaft, a locking bar pivotally attached at one end to the depending lug, a sleeve attached to the frame and in which the locking bar is endwise slidable, a cap on the forward end of the locking bar limiting rearward movement of the locking bar in the sleeve to a position where the teeth on the axle shaft are adapted to have bales piled thereon, locking means connecting the locking bar and sleeve normally holding said bar and sleeve with the teeth in bale receiving position, and means connected to the locking means for effecting disengagement of said locking means.

4. In a bale stooker as set out in claim 3, said locking means and manually releasable means comprising a trip bar mounted vertically slidable in the platform, links pivoted to the lower end of the trip bar extending forwardly and rearwardly, means pivotally attaching the rearward link to the locking bar, and means pivotally attaching the forward link to the sleeve.

5. A bale stooker as set out in claim 4 and including an arm on one of the links, and a spring anchored to the locking bar and attached to said arm, said spring normally holding the links with the pivotal attachment of the links to the trip bar above the pivotal attachment of the links to the locking bar and sleeve.

References Cited in the file of this patent

UNITED STATES PATENTS

| | | |
|---|---|---|
| 2,552,713 | Flower | May 15, 1951 |
| 2,748,965 | Grey | June 5, 1956 |
| 2,828,600 | Kormendy | Apr. 1, 1958 |